Patented July 14, 1931

1,814,210

UNITED STATES PATENT OFFICE

CHARLES N. FREY AND ALFRED SCHULTZ, OF NEW YORK, N. Y., AND ARTHUR P. HARRISON, OF WASHINGTON, DISTRICT OF COLUMBIA, ASSIGNORS, BY MESNE ASSIGNMENTS, TO STANDARD BRANDS INCORPORATED, OF DOVER, DELAWARE, A CORPORATION OF DELAWARE

PROCESS FOR MANUFACTURING YEAST

No Drawing. Application filed June 30, 1927. Serial No. 202,745.

This invention relates to the manufacture of bakers' yeast and has a general object the production of large yields of yeast of good baking and keeping quality in a convenient, efficient and economical manner.

A more specific object of the invention is to provide an improved process of manufacturing bakers' yeast preferably by the aeration process from nutrient solutions in which a sugar material, such as molasses, is used as the principal source of yeast assimilable sugar, and in which requisite amounts of yeast assimilable nitrogen are supplied principally in the form of urea.

Other objects of the invention will in part be obvious and will in part appear hereinafter.

In carrying out the present invention, a suitable sugar material, such as cane molasses or a mixture of cane and beet molasses, preferably containing a preponderence of the former over the latter, is first suitably clarified and filtered by any desired method, preferably with calcium superphosphate. This material is then diluted to the desired extent and the requisite amounts of mineral nutrients, such as phosphates and the like, are added thereto. Urea is subsequently added to supply the nitrogen necessary for the growth of the yeast to produce large yields (for example, upwards of 80–90 lbs. yeast per 100 lbs. molasses), of good quality, i, e., having good color, baking and keeping qualities; and yeast is propagated with aeration in the nutrient solution thus formed.

The present invention comprises not merely the use of urea as a nitrogen source, but a sequential and correlated control of the various factors or conditions of the propagating liquid. For example, unless there is a proper control of the propagating liquid, the yeast will have a tendency to split up the urea into ammonia at a rate in excess of that at which the nitrogen can be assimilated by it. As a result of this, the propagating liquid would have a tendency to become increasingly alkaline in character, which is undesirable from the standpoint of the yeast manufacturer, particularly as it is conducive to infection of the propagating liquid by undesirable microorganisms. In accordance with the present invention the hydrogen-ion concentration of the nutrient solution and the urea concentration is carefully controlled, either at the beginning of the process or during the process of propagation, so that the urea will be split up into ammonia at a rate sufficient to supply the requisite amounts of nitrogen to the yeast, but not substantially in excess of that at which the yeast assimilates the nitrogen.

For example, we have found that if the hydrogen-ion concentration of the nutrient solution is within a range of 4.2 to 5. pH at the beginning of the process, usually the rate of splitting up the urea is moderated so that the yeast assimilates the nitrogen from the ammonia as it is formed, and there is no preponderant tendency toward alkalinity in the prapagating liquid. Moreover, if it is desired to propagate the yeast at a somewhat higher pH, as for example from 5.2 to 5.8 pH, the rapid splitting up of the urea into ammonia can be compensated for by the gradual addition to the propagating liquid of small quantities of a suitable acid.

The principles of the present invention are applicable to the so-called "straight fermentation" processes in which the yeast is propagated with aeration in the entire amount of the nutrient solution, although we prefer to use the "continuous addition" and "continuous-addition-continuous-withdrawal" processes, such as are exemplified by Hayduck Patents Nos. 1,449,106, 1,449,107 and 1,449,108.

If, for example, it is desired to apply the principles of the present invention to "continuous addition" processes, a typical procedure would be as follows: 300 pounds of cane molasses is diluted to about 20° Bg., and clarified with about 3% calcium superphosphate $(CaH_4(PO_4)_2)$, and after filtration about 4% of urea is dissolved therein and the acidity is adjusted to about 4.3 pH. Approximately 15% of the nutrient solution so prepared is placed in the fermenter, diluted to about 2° Bg., and about 20% of the stock yeast is added. The liquid in the fermenter is thereupon aerated for from 8 to 9 hours, and the remaining nutrient solution is slowly and continuously added, in accordance with the growth requirements of the yeast, in the well-known manner.

By the adjustment of the acidity of the liquid to the pH of about 4.3, the rate of splitting up of the urea into ammonia, is so controlled that at no time does the acidity of the nutrient solution tend to fall below about 4.6 pH.

As an example of the second method of controlling the hydrogen-ion concentration, the acidity of the nutrient solution may be adjusted to about 5.1 pH, and during the period of propagation small amounts of sulphuric acid, approximating about 4 pounds total, may be added fractionally to the propagating liquid in the fermenter, in order to maintain the pH at 5.0 or below It will be understood, of course, that the above examples are merely illustrative, and the proportions of materials and methods of operation may be varied within the skill in the art without departing from the spirit of the invention. It will also be understood that if desired the two methods of controlling the hydrogen-ion concentration of the propagating liquid may be combined, in order that the beneficial effects of both may be obtained, and that the urea may be added to the mash all at the beginning, or it may be added fractionally from time to time during the propagation period.

Moreover, if desired, the urea splitting action of the yeast may be supplemented by adding to the mash an additional amount of the enzyme urease, obtained from yeast or any other suitable source. For the above sized mash, about 1 pound of ground soy bean containing urease will be sufficient. In such case the action of the added enzyme would be controlled as above indicated.

In the presently known commercial methods of manufacturing yeast, such as are exemplified by the process described in the United States patent to Hayduck, No. 1,449,103, the nitrogen requirements of the yeast are largely furnished by the addition to the mash of ammonium salts of the inorganic acids. In such cases, however, it is found that when the yeast assimilates nitrogen from the ammonium salt, an increasing acidity is developed in the propagating liquid, as a result of the setting free of the acid components of the ammonium salts, and the excess of such acidity must be controlled by neutralization. By the use of urea, as set forth in the present invention, the necessity of such neutralization is dispensed with; although in the second example of the present invention, set forth above, the acid-forming properties of such inorganic salts of ammonia may be utilized in that if additional acidity is desired in the propagating liquid, it may be supplied by adding thereto such an ammonium salt in place of part of the urea or supplemental to the acid addition specified. We have found, for example, that if, when using the above specified amounts of molasses, about 3½% of urea and about 1% of ammonium sulphate are used, the acidity in the fermenter will remain fairly constant at about 4.1–4.6 pH throughout the fermentation. The present method of pH control may also, if desired, be used in combination with the neutralization control above mentioned.

It is to be understood that the following claims are intended to cover all of the generic and specific features of the invention herein described, and all statements of the scope of the invention which as a matter of language might be said to fall therebetween. Particularly it is to be understood that the word "bakers," is used herein for the purpose of indicating the type of yeast manufacture to which the invention appertains.

Having described our invention, what we claim as new and desire to secure by Letters Patent is:

1. In a process of manufacturing bakers' yeast by propagation with aeration in a yeast nutrient solution containing molasses as a principal source of yeast assimilable sugar, in combination, the improvements which comprise supplying requisite amounts of yeast assimilable nitrogen in the form of urea, and controlling the hydrogen-ion concentration of the nutrient solution to prevent splitting of the urea into ammonia at a rate materially in excess of that at which it can be utilized by the yeast.

2. In a process of manufacturing bakers' yeast by propagation with aeration in a yeast nutrient solution containing molasses as a principal source of yeast assimilable sugar, in combination, the improvements which comprise supplying requisite amounts of yeast assimilable nitrogen in the form of urea, and adjusting the initial acidity of the yeast nutrient solution to a pH of approximately 4.2–4.5.

3. In a process of manufacturing bakers' yeast by propagation with aeration in a yeast nutrient solution containing molasses as a principal source of yeast assimilable sugar, in combination, the improvements which comprise supplying requisite amounts of yeast assimilable nitrogen in the form of urea, and during the period of yeast propagation adding sufficient acid to the propagating liquid to maintain the hydrogen-ion concentration at about pH 4.2–4.5.

4. In a process of manufacturing bakers' yeast by propagation with aeration in a yeast nutrient solution containing molasses as a principal source of yeast assimilable sugar, in combination, the improvements which comprise supplying requisite amounts of yeast assimilable nitrogen in the form of urea, and during the period of yeast propagation adding sufficient acid to the propagating liquid to maintain the pH below about 4.5.

5. In a process of manufacturing bakers' yeast by propagation with aeration in a yeast nutrient solution containing molasses as a principal source of yeast assimilable sugar, in combination, the improvements which comprise supplying requisite amounts of yeast assimilable nitrogen by the fractional addition of urea during the period of yeast propagation, and controlling the hydrogen-ion concentration of the nutrient solution to prevent splitting of the urea into ammonia at a rate materially in excess of that at which it can be utilized by the yeast.

6. In a process of manufacturing bakers' yeast by propagation with aeration in a yeast nutrient solution containing molasses as a principal source of yeast assimilable sugar, in combination, the improvements which comprise supplying requisite amounts of yeast assimilable nitrogen by the fractional addition of urea, and during the period of yeast propagation adding sufficient acid to the propagating liquid to maintain the hydrogen-ion concentration at about pH 4.2–4.5.

7. In a process of manufacturing bakers' yeast by propagation with aeration in a yeast nutrient solution containing molasses as a principal source of yeast assimilable sugar, in combination, the improvements which comprise supplying requisite amounts of yeast assimilable nitrogen by the fractional addition of urea, and during the period of yeast propagation adding sufficient acid to the propagating liquid to maintain the pH below about 5.

8. In a process of manufacturing bakers' yeast by propagation with aeration in a yeast nutrient solution containing molasses as a principal source of yeast assimilable sugar, in combination, the improvements which comprise supplying a portion of the yeast assimilable nitrogen by the addition of urea, and during the period of yeast propagation adding an ammonium salt of an inorganic acid in amounts sufficient to supply a portion of the yeast assimilable nitrogen and to maintain the hydrogen-ion concentration of the propagating liquid at approximately pH 4.2 to 4.5.

9. In a process of manufacturing bakers' yeast by propagation with aeration in a yeast nutrient solution containing molasses as a principal source of yeast assimilable sugar, in combination, the improvements which comprise supplying a portion of the yeast assimilable nitrogen by the addition of urea, and during the period of yeast propagation adding an ammonium salt of an inorganic acid in amounts sufficient to supply a portion of the yeast assimilable nitrogen and to act to maintain the hydrogen-ion concentration at a pH of approximately 4.2–4.5, and supplementing the acidifying action of the ammonium salt by the fractional addition of acid during the period of yeast propagation.

10. In a "continuous addition" process of manufacturing bakers' yeast, in which the propagation of the yeast is initiated with aeration in a small amount of dilute nutrient solution in a fermenter, and in which further nutrients are supplied thereto during the period of propagation in accordance with the growth requirements of the yeast; the improvement which comprises adding to the propagating liquid urea and ammonium sulphate in such proportions as to supply yeast assimilable nitrogen to the yeast and to maintain the hydrogen-ion concentration of the propagating liquid substantially constant.

11. In a process of manufacturing bakers' yeast by propagation with aeration in a yeast nutrient solution containing molasses as a principal source of yeast-assimilable sugar, in combination, the improvements which comprise supplying requisite amounts of yeast-assimilable nitrogen by the addition of appropriate amounts of urea, adding a small amount of urease, and adjusting the initial acidity of the yeast nutrient solution to a pH of approximately 4.2–4.5.

12. In a process of manufacturing bakers' yeast by propagation with aeration in a yeast nutrient solution containing molasses as a principal source of yeast-assimilable sugar, in combination, the improvements which comprise supplying requisite amounts of yeast-assimilable nitrogen by the fractional addition of urea, adding a small amount of urease, and during the period of yeast propagation adding sufficient acid to the propagating liquid to maintain the pH below about 5.

13. In a process of manufacturing bakers' yeast by propagation in a yeast nutrient solution containing molasses as a principal source of yeast assimilable sugar, in combination, the improvements which comprise supplying requisite amounts of yeast assimilable nitrogen in the form of urea, and controlling the hydrogen-ion concentration of the nutrient solution to prevent splitting of the urea into ammonia at a rate materially in excess of that at which it can be be utilized by the yeast.

14. In a process of manufacturing bakers' yeast by propagation in a yeast nutrient solution containing molasses as a principal source of yeast assimilable sugar, in combination, the improvements which comprise supplying requisite amounts of yeast assimilable nitrogen by the fractional addition of urea during the period of yeast propagation, and controlling the hydrogen-ion concentration of the nutrient solution to prevent splitting of the urea into ammonia at a rate materially in excess of that at which it can be utilized by the yeast.

15. In a "continuous addition" process of manufacturing bakers' yeast, in which the propagation of the yeast is initiated in a small amount of dilute nutrient solution in a fermenter, and in which further nutrients are supplied thereto during the period of propagation in accordance with the growth requirements of the yeast; the improvement which comprises adding to the propagating liquid urea and ammonium sulphate in such proportions as to supply yeast assimilable nitrogen to the yeast and to maintain the hydrogen-ion concentration of the propagating liquid substantially constant.

I testimony whereof, we have hereunto affixed our signatures.

CHARLES N. FREY.
ALFRED SCHULTZ.
ARTHUR P. HARRISON.